*A. F. Ahrens,*
*Attaching Teeth to Plates.*
*N⁰ 8,091.    Patented May 13, 1851.*
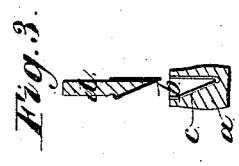

UNITED STATES PATENT OFFICE.

A. F. AHRENS, OF PHILADELPHIA, PENNSYLVANIA.

SETTING TEETH.

Specification of Letters Patent No. 8,091, dated May 13, 1851.

*To all whom it may concern:*

Be it known that I, ADOLPH F. AHRENS, of Philadelphia, in the State of Pennsylvania, have invented an Improved Mode of Setting Artificial Teeth, of which the following is a full, clear, and exact description, reference being had to the accompanying drawings, making part of this specification, in which—

Figure 1 is an elevation of the tooth; Fig. 2, a separate view of the metal pivot, and Fig. 3 a vertical section of the tooth and pivot separate.

The same letters indicate like parts in all the figures.

The object of my invention is to attach artificial teeth firmly to the plate usually placed in the roof of the mouth, so that the metal used to fasten them in shall not under any circumstances be brought into contact with the tongue.

The nature of my invention consists in attaching the tooth to the plate by means of a wedge formed pivot soldered or otherwise affixed to the plate, the tooth being provided with a corresponding recess into which the pivot accurately fits when the said pivot is covered and the recess lined with platinum and the union of the two is effected by the use of pure tin.

The tooth (*a*), see accompanying drawings, is first accurately ground to fit the plate and a wedge formed recess (*b*) made therein, into which a lining (*c*) of platinum
is burnt. The wedge-formed pivot (*d*), which I usually make of gold, is securely attached to the plate by soldering and is also covered with a coating of platinum.

In attaching the tooth to the pivot I use a small quantity of pure tin or solder, which from its affinity for platinum immediately unites the two in a secure and perfect manner.

What I claim as my invention and desire to secure by Letters Patent is—

Attaching artificial teeth to a plate in the roof of the mouth by means of a wedge-formed recess in the tooth, and a pivot of corresponding shape soldered or otherwise attached to the plate, when the union of the two is effected by the use of platinum and tin or solder, substantially in the manner and for the purpose specified.

ADOLPH F. AHRENS.

Witnesses:
C. A. W. BROWNE,
ALEX. J. PORTER BROWNE.